US008348163B2

(12) United States Patent
Oishi

(10) Patent No.: US 8,348,163 B2
(45) Date of Patent: Jan. 8, 2013

(54) ANTENNA DEVICE AND RFID TAG READER HAVING THE SAME

(75) Inventor: Sadatoshi Oishi, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 203 days.

(21) Appl. No.: 12/874,461

(22) Filed: Sep. 2, 2010

(65) Prior Publication Data

US 2011/0062234 A1 Mar. 17, 2011

(30) Foreign Application Priority Data

Sep. 11, 2009 (JP) ................................ 2009-210896

(51) Int. Cl.
*G06K 19/06* (2006.01)

(52) U.S. Cl. ....................................... 235/439; 235/492

(58) Field of Classification Search .................. 235/439, 235/492, 491, 493, 486, 487, 375, 449
See application file for complete search history.

(56) References Cited

U.S. PATENT DOCUMENTS 5,955,995 A * 9/1999 Silverstein .................... 343/729
2006/0001571 A1* 1/2006 Sathath .................. 343/700 MS
2007/0113978 A1* 5/2007 Ishii et al. ................ 156/345.42
2009/0231215 A1* 9/2009 Taura ............................ 343/702
2009/0301781 A1* 12/2009 Fang et al. ....................... 175/50

FOREIGN PATENT DOCUMENTS

JP 2008-236046 10/2008
JP 2008-278206 11/2008
JP 2008-306495 12/2008
JP 2009-089428 4/2009

* cited by examiner

*Primary Examiner* — Thien M Le
(74) *Attorney, Agent, or Firm* — Turocy & Watson, LLP

(57) ABSTRACT

An antenna device includes a first conductive plate, a second conductive plate, arranged in parallel with the first conductive plate, which has at least one slot formed thereon, a power feeding element located between the first and second conductive plates to feed power to the first conductive plate, and a shutter configured to be movable to close/open the slot of the second conductive plate.

14 Claims, 15 Drawing Sheets

ANTENNA DEVICE AND RFID TAG READER HAVING THE SAME

CROSS-REFERENCE TO RELATED APPLICATION

This application is based upon and claims the benefit of priority from the prior Japanese Patent Application No. 2009-210896, filed on Sep. 11, 2009, the entire contents of all of which are incorporated herein by reference.

FIELD

The disclosure relates generally to an antenna device which is used in an RFID (Radio Frequency Identification) tag reader. The antenna device transmits and/or receives data to and/or from RFID tags attached to articles.

BACKGROUND

In a conventional case that inventory of articles, e.g., clothes, is carried out in a shop, a handy type RFID tag reader/writer may be used to collectively read out data of RFID tags which are respectively attached to clothes packed in a box or on a shelf.

In such a case, it is an ideal that data of all of the RFID tags attached to clothes can be read out from the outside of the box or shelf. However, it may be difficult in practice due to overlap of antennas of a plurality of RFID tags or an antenna of RFID tag touching a metal. It may also adversely affect the reading accuracy of the RFID tag reader/writer.

According to the above-described circumstances, there is a desire that an antenna of the RFID tag reader/writer is inserted into the box in which clothes are packed and data of RFID tags attached to clothes are collectively read out by the inserted antenna as much as possible. To achieve the above desire, it is required to minimize the antenna of the RFID tag reader/writer and to control the radiation direction of the antenna.

However, the RFID reader/writer generally uses a patch antenna which radiates radio wave in a single direction. Therefore, data of RFID tags only located at a side in a radio wave radiation direction of such a patch antenna can be read out even if the antenna is inserted into the packed cloths in the box.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention, wherein.

DETAILED DESCRIPTION

Figure 1:
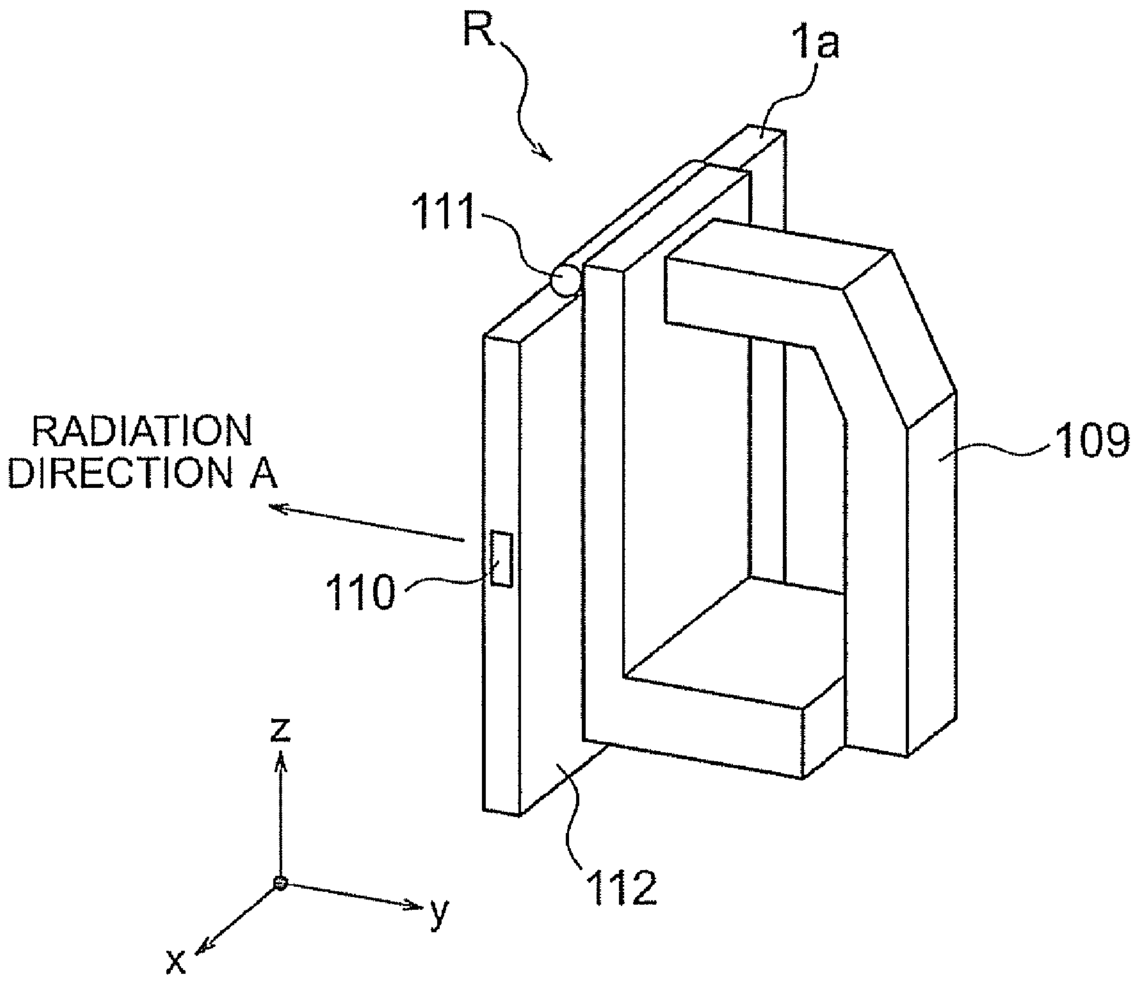
FIG. 1 is a perspective view illustrating an entire constitution of an RFID tag reader/writer according to a first embodiment.

Embodiments will now be described in more detail with reference to the accompanying drawings. However, the same numerals are applied to the similar elements in the drawings, and therefore, the detailed descriptions thereof are not repeated.

In general, according to one embodiment, it is to provide an antenna device which may change over a radiation area of radio wave radiated to communicate with RFID tags with a simple construction. The antenna device may include a first conductive plate, a second conductive plate, arranged in parallel with the first conductive plate, on which at least one slot is formed, a power feeding element arranged between the first and second conductive plates to provide the first conductive plate with an electric power and a shutter for opening or closing the slot on the second conductive plate.

(First Embodiment)

A first embodiment will be described with reference to FIG. 1. FIG. 1 is a perspective view illustrating an overall construction of an RFID tag reader/writer according to the first embodiment.

An RFID tag reader/writer R of the first embodiment is used to read out data from an RFID tag attached to an article. In this embodiment, an RFID reader may be used according to required functions.

The RFID tag reader/writer R includes an antenna section 1*a* (antenna device) which houses a plurality of kinds of elements constituting an antenna in a housing made of plastic, a handle section 109 that a user grasps when the RFID tag reader/writer R is used, a hinge section 111, provided between the antenna section 1*a* and the handle section 109, which supports the antenna section 1*a* foldable against the handle section 109 and, a lever 110. A circuitry construction having a reader/writer function may be housed in the handle section 109 or a base section between the handle section 109 and the antenna section 1*a* shown in FIG. 1.

FIG. 1 shows a state in which the antenna section 1*a* is at a folded-position against the handle section 109. In the concrete, the antenna section 1*a* is supported at one side by the handle section 109 and is extendable around the hinge section 111 so that it can move from the folded-position that a surface of the antenna 1*a* on which a slot (described later) is formed faces the handle section 109 to an extended-position that the surface of the antenna 1*a* goes away from the handle section 109 and vice versa. The antenna section 1*a* is extendable, for example, at 90 degrees relative to the handle section 109.

Figure 2:
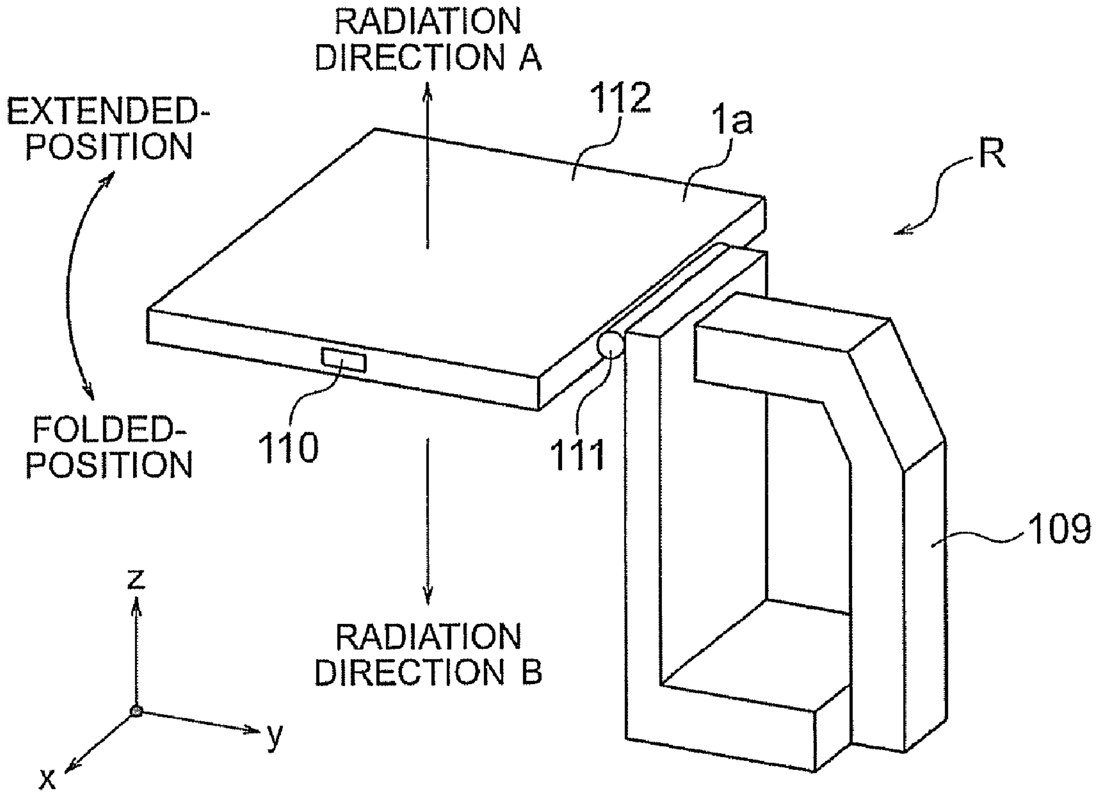
FIG. 2 is a perspective view illustrating a state in which an antenna section shown in FIG. 1 is unfolded to an extended-position relative to a handle section.

FIG. 2 is a perspective view showing a state in which the antenna section 1*a* moves to the extended-position against the handle section 109.

The RFID tag reader/writer R of the first embodiment is capable of changing over the antenna section 1*a* between the folded-position that the antenna section 1*a* is able to radiate radio wave in a radiation direction A in FIG. 1 which is suitable to selectively read out data of RFID tag located at a limited area or in a limited direction and the extended-position that the antenna section 1*a* is able to radiate radio wave from the opposite surfaces of the antenna section 1*a* in radiation directions A and B shown in FIG. 2, by extending/folding the antenna section 1*a* against the handle section 109.

Figure 3:
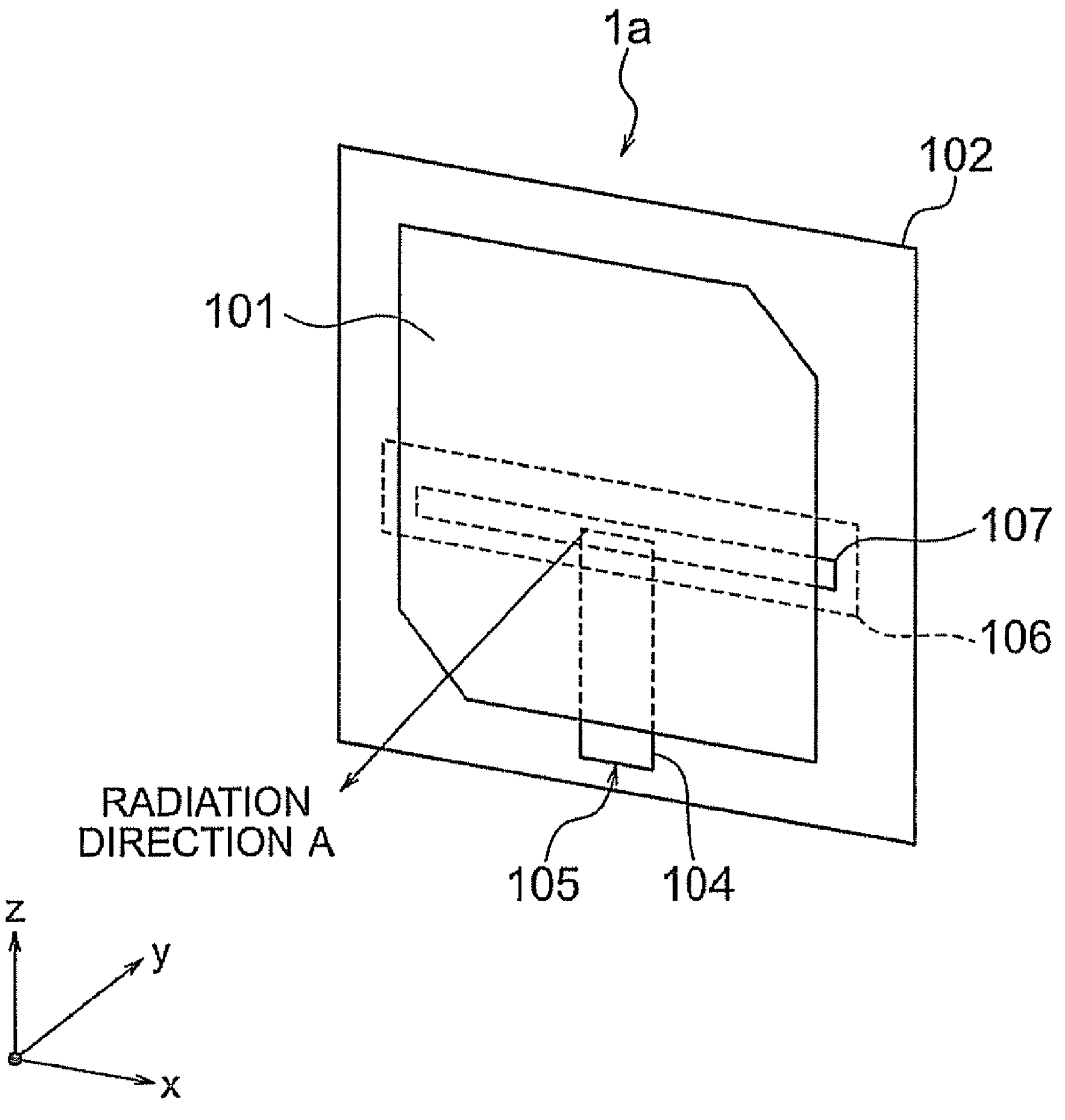
FIG. 3 is a perspective view explaining an internal brief construction of a housing of the antenna section at one side.
Figure 4:
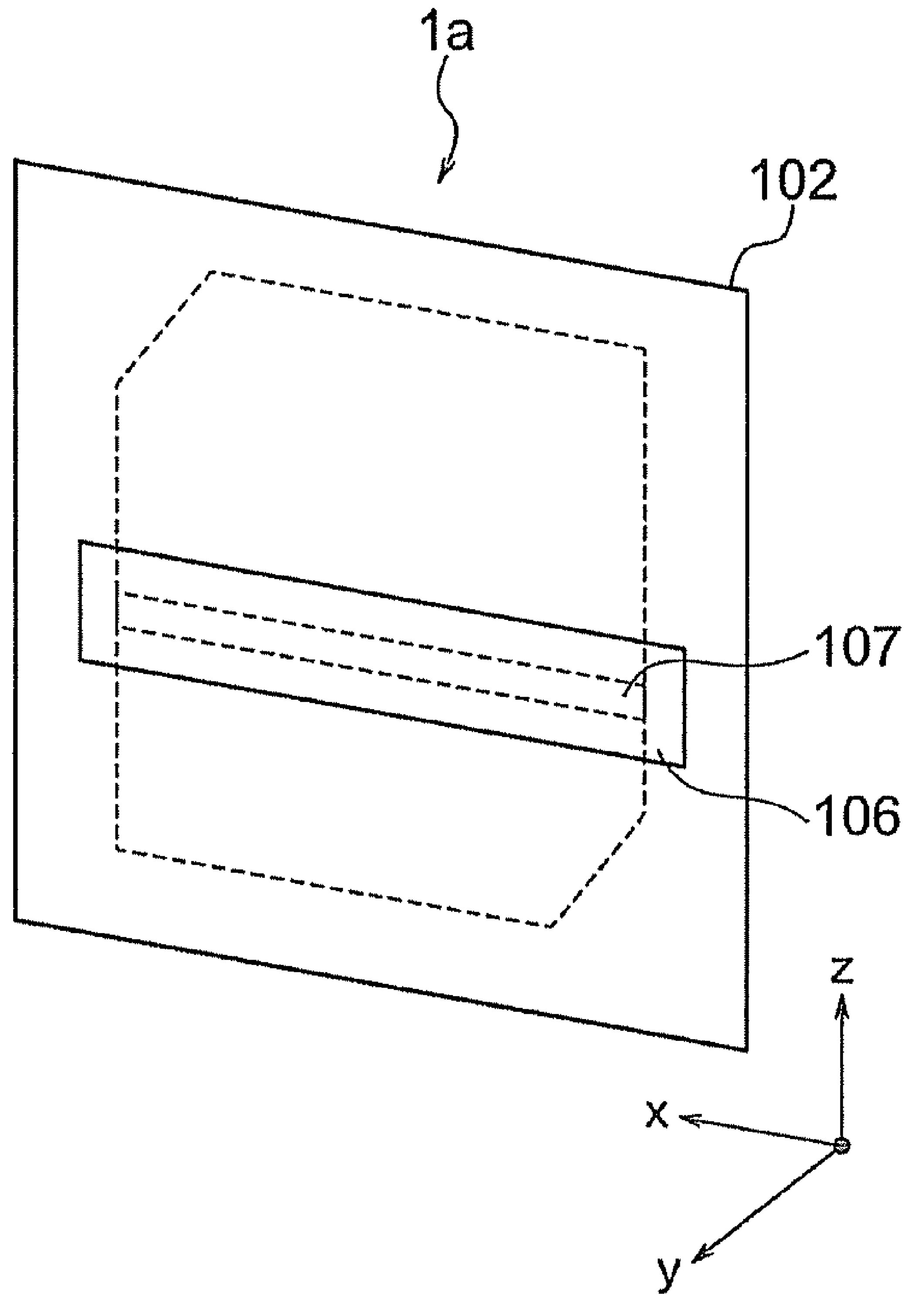
FIG. 4 is a perspective view explaining an internal brief construction of the housing of the antenna section at the other side.

FIGS. 3 and 4 are perspective views respectively illustrating a brief construction in the housing 112 of the antenna section 1*a* according to the first embodiment.

The antenna section 1*a* includes a first conductive plate 101, a second conductive plate 102, a power feeding element 104 and a shutter 106. It is preferable to set a size of the first conductive plate 101 to about 140 mm×140 mm in case that the RFID tag reader/writer R functions as a reader/writer of UHF band. The first conductive plate 101 set to the above-described size resonates at 953 MHz band. Thus, the first conductive plate 101 functions as a radiating element.

In addition, the first conductive plate 101 is formed with a conductive plate of a rectangular shape that has a pair of cut-sections (perturbation elements) respectively formed at diagonal portions of the plate, as shown in FIG. 3, so that it functions as a radiation element radiating a circular polarized radio wave.

When perturbation elements each having an area ($\Delta S$) are formed on a rectangular shaped radiation element having an area ($S>\Delta S$) in a direction ±45 degrees to a feed direction, two orthogonal modes which are crossed in a right angle in space are generated. The two modes respectively have different resonance frequencies and a difference between the resonance frequencies of the two modes increases if a perturbation amount ($|\Delta S/S|$) increases. Since the different two resonance frequencies are crossed in a right angle, the circular polarized radio wave is radiated from the antenna. By regulating the location of the perturbation element to the feed direction, the circular polarized antenna that radiates a circular polarized radio wave in a right hand or left hand rotation is constituted.

The reason why the first conductive plate 101 is used as a radiating element for radiating a circular polarized radio wave is that, in view of reading ability to an RFID tag, the circular polarized antenna is generally suitable as an antenna of the RFID tag reader/writer. The second conductive plate 102 is arranged in parallel with the first conductive plate 101 and also acts as an earth conductor of the patch antenna.

The second conductive plate 102 functions as an earth conductor when the first conductive plate 101 functions as a patch antenna. The size of the earth conductor is desirable as large as possible. In this embodiment, since the size of the first conductive plate 101 is about 140 mm×140 mm, the size of the second conductive plate 102 is set to square of about 160 mm~300 mm.

A slot 107, a rectangular through hole, is formed on the second conductive plate 102 to constitute a slot antenna. The entire length of the slot 7 (slot length) is basically set to a half wavelength of the frequency of radio wave to be radiated and it is required to regulate the length thereof according to the distance between the first conductive plate 101 and the second conductive plate 102. In addition, the slot 107 maintains a high frequency conductivity with the second conductive plate 102.

The power feeding element 104 locates between the first conductive plate 101 and the second conductive plate 102 and supplies power to the first conductive plate 101.

Either an air layer or a dielectric substance layer is formed between the first conductive plate 101 and the second conductive plate 102. A distance between the first conductive plate 101 and the second conductive plate 102 is set to 5 mm~20 mm. If a distance between the first conductive plate 101 and the second conductive plate 102 increases, a bandwidth of the antenna section 1*a* becomes wide but a thickness of the antenna section 1*a* increases as a whole. Therefore, the distance therebetween may be set to a suitable amount according to its use.

The power feeding element 104 locates at a middle of the distance between the first conductive plate 101 and the second conductive plate 102 and, the impedance of the power feeding point 105 can be regulated by changing the length of the power feeding element 104 of rectangular shape. Power is fed to the power feeding element 104 from the radio section (not shown) through a coaxial connector (not shown) connected to the power feeding point 105.

Figure 5:
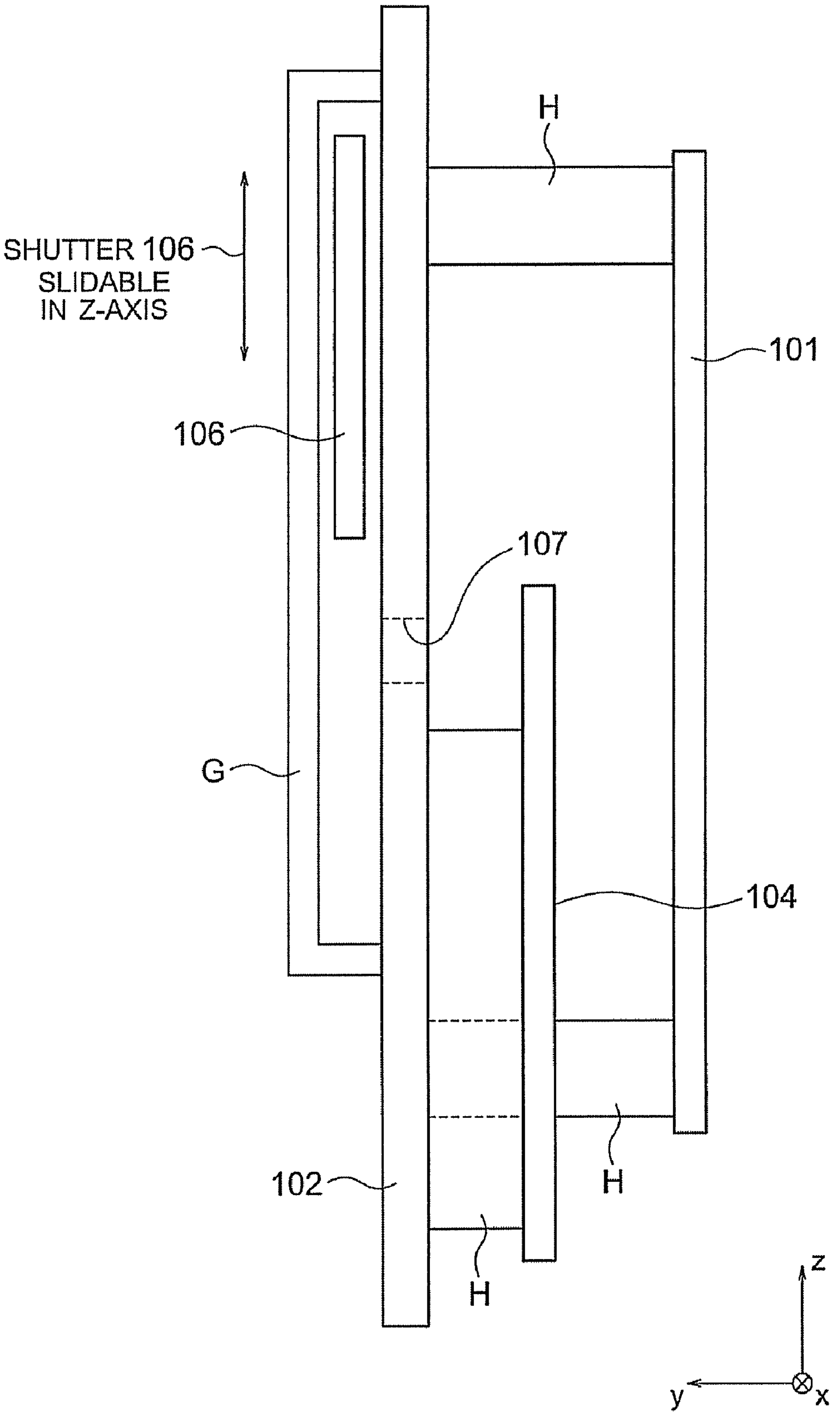
FIG. 5 is a side view illustrating an internal structure of the antenna section shown in an X-axis direction in FIG. 1.

FIG. 5 is a rough constitution view illustrating the internal structure of the antenna section 1*a*, shown in x-axis direction, according to the first embodiment.

The first conductive plate 101 and the power feeding element 104 are respectively supported by the second conductive plate 102 through supporters H, e.g., formed styrol, whose dielectric factor is nearly 1, as shown in FIG. 5. A construction other than the above described may be adopted to support the first conductive plate 101 and the power feeding element 104.

A shutter 106 is a conductive plate movable between a closed position at which the shutter 106 closes the slot 107 and an open position at which the shutter 106 does not interrupt the radio wave radiated through the slot 107. In the concrete, the shutter 106 has a size that can cover the entire slot 107 and is slidable in a z-axis direction along the second conductive plate 102 by a guide G, as shown in FIG. 5. The shutter 106 mechanically connects with a lever 110, as shown in FIGS. 1 and 2, and slides in the z-axis direction by the operation of a user, manually. In this embodiment, the guide G is excluded from the Figs, except FIG. 5, for the purpose of easily understanding the relationship in location of construction elements.

Figure 6:
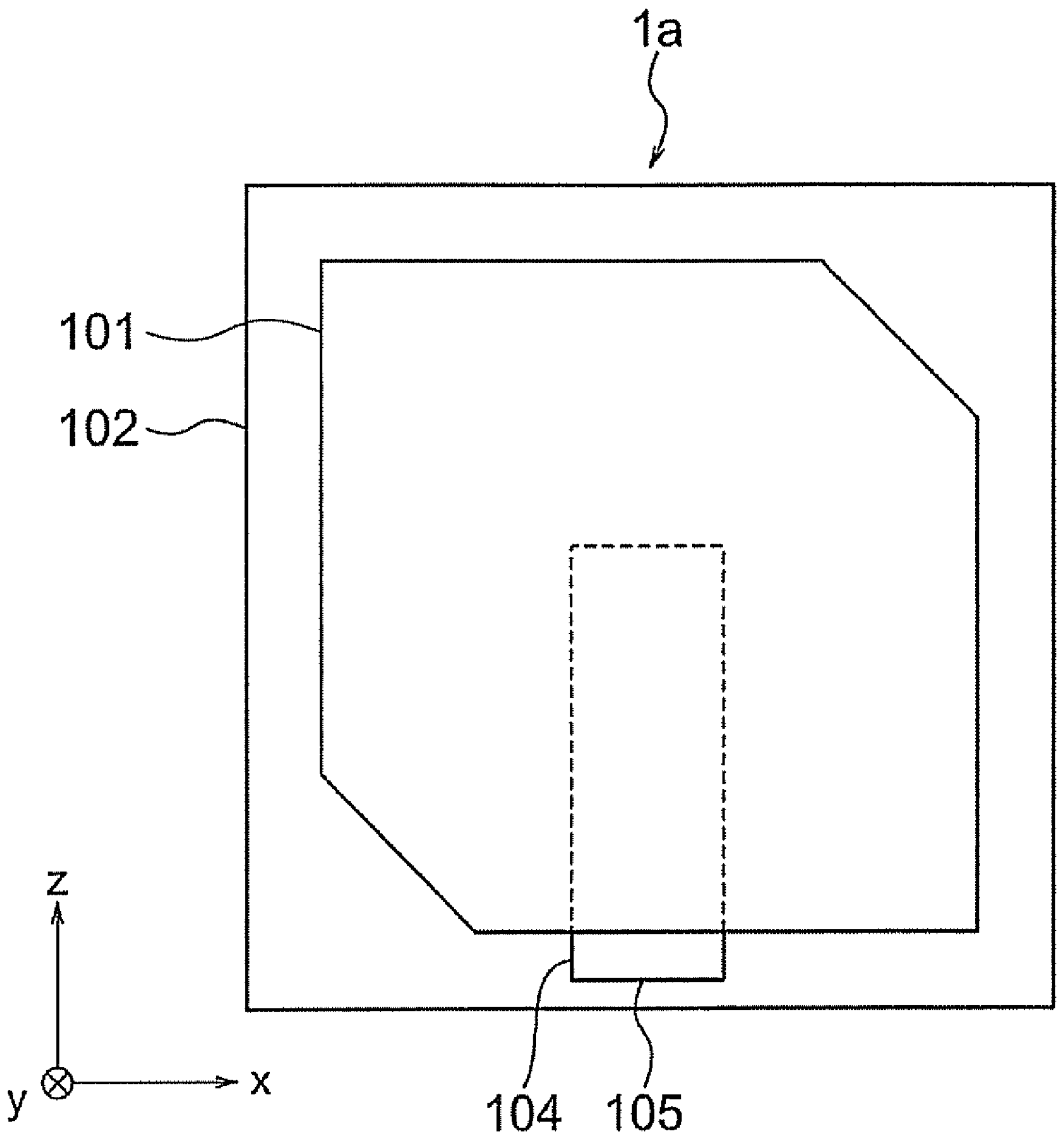
FIG. 6 is a front view illustrating a relationship in a location between principal construction elements.
Figure 7:
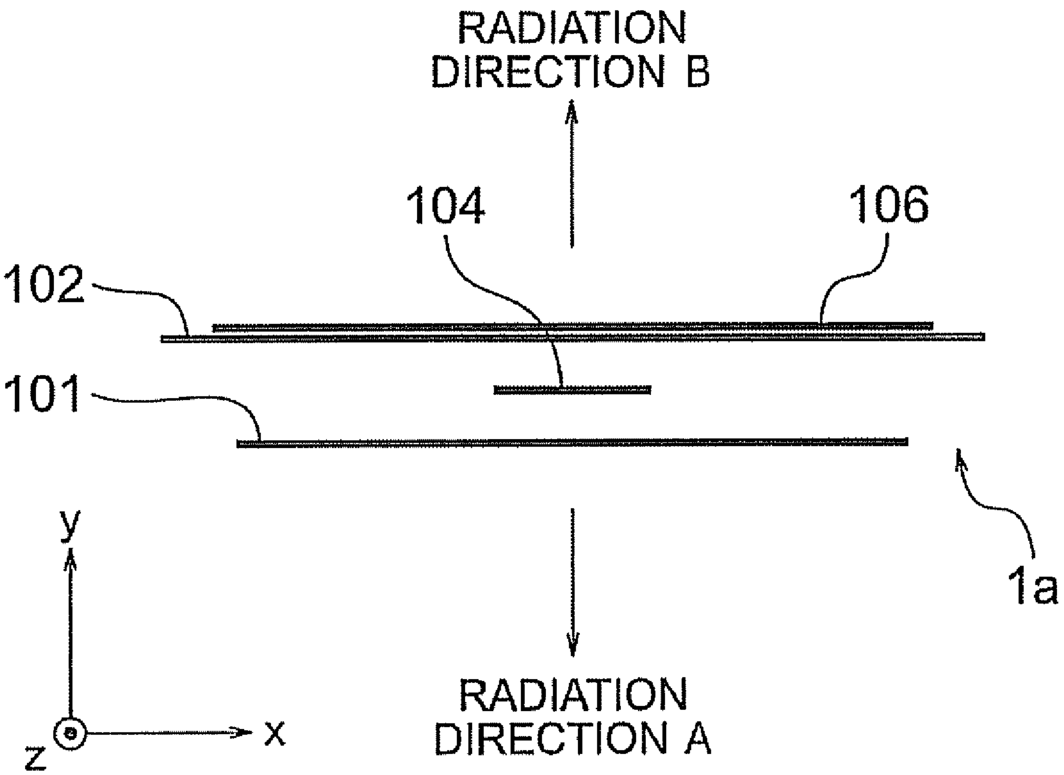
FIG. 7 is a plan view illustrating a relationship in a location between principal construction elements.
Figure 8:
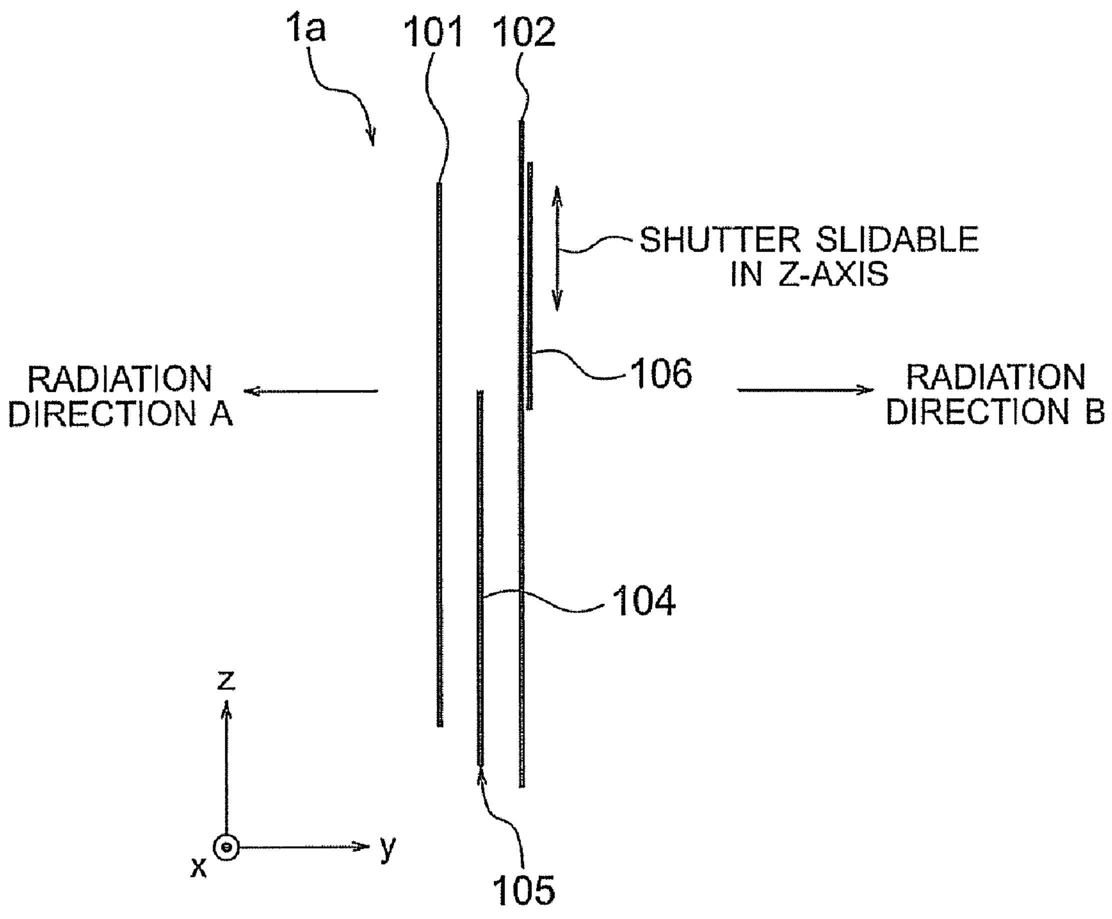
FIG. 8 is a side view illustrating a relationship in a location between principal construction elements.

FIGS. 6~8 are views illustrating a relationship in location of major parts of the antenna section 1*a* of the first embodiment.

Figure 9:
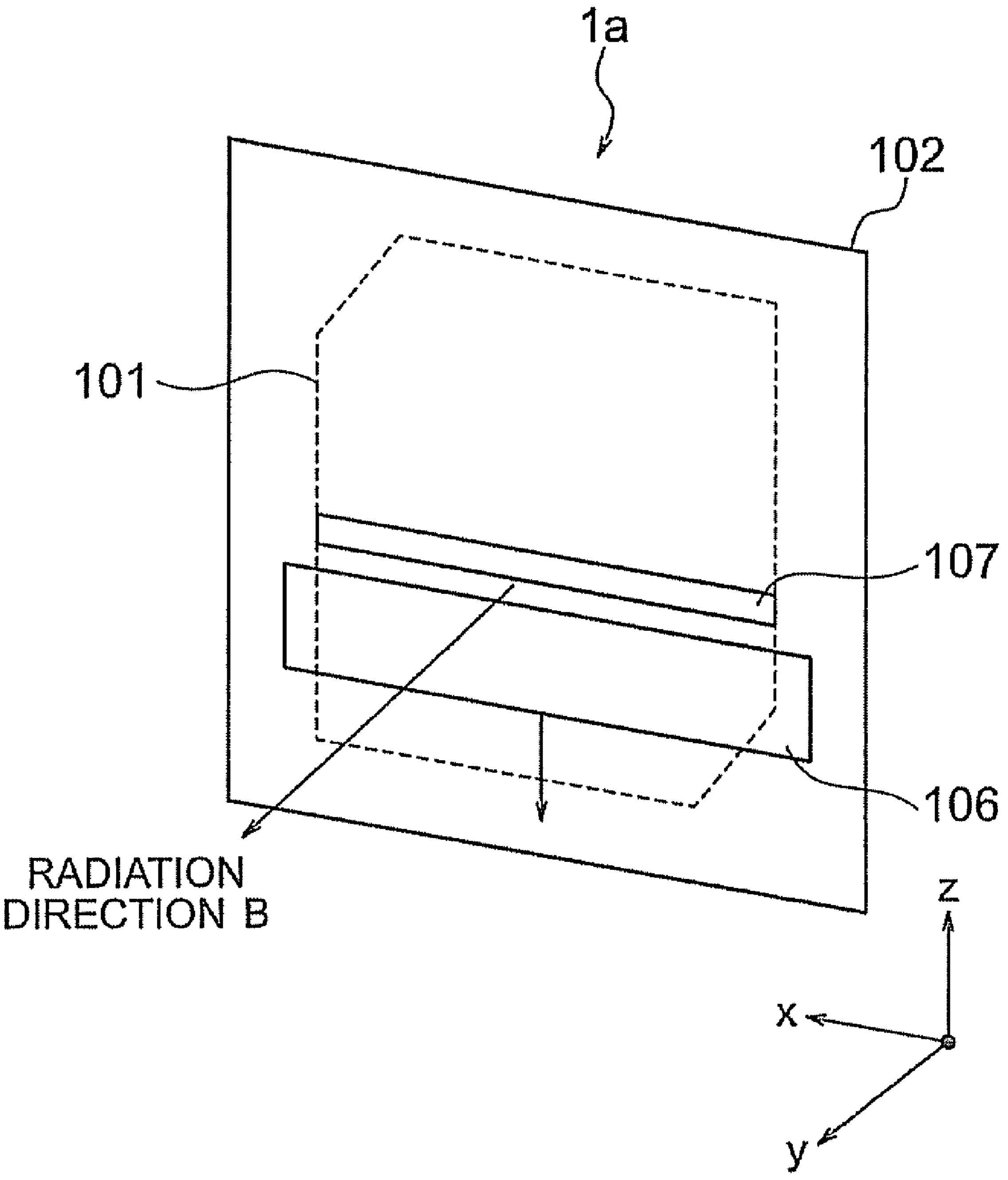
FIG. 9 is a view illustrating a state in which a slot is opened by sliding a shutter to an open position with a lever from the state shown in FIG. 4.

FIG. 9 is a view illustrating a state that the slot 107 is opened such that the shutter 106 is slid with the lever 110 to the open location from the state shown in FIG. 4.

Figure 10:
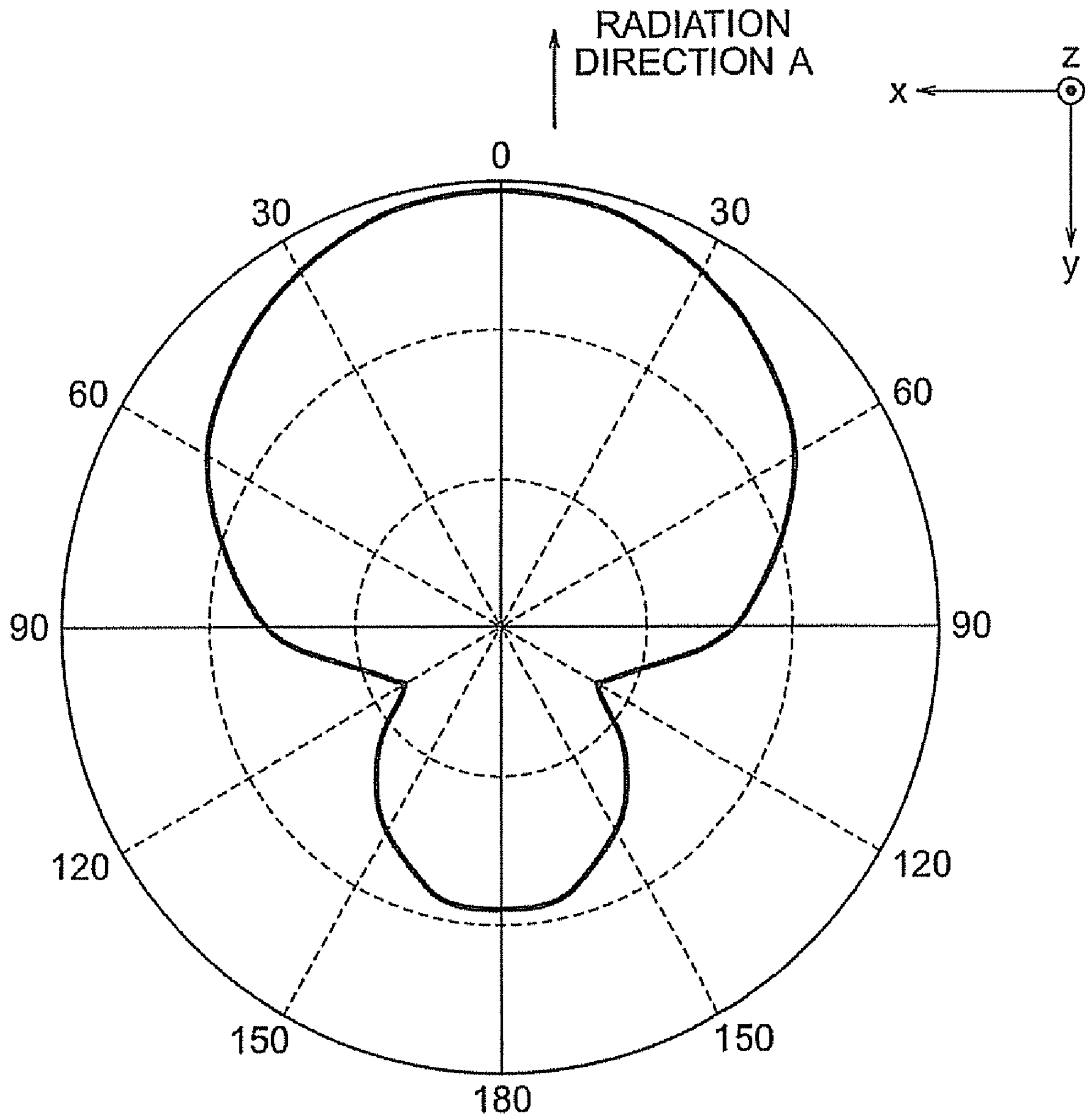
FIG. 10 is a view illustrating a radio wave radiation pattern in a state that the slot is closed.

The RFID tag reader/writer R according to the embodiment, the antenna section 1*a* acts as a patch antenna which radiates radio wave mainly in a radiation direction A in a state that the shutter 106 closes the slot 107. That is, the first conductive plate 101 functions as a radiating element and the second conductive plate 102 functions as an earth conductor. In this state, a radiation pattern on the x-y plane is as shown in FIG. 10 and a main lobe thereof is formed in a zero degree (0°) direction (radiation direction A).

Figure 11:
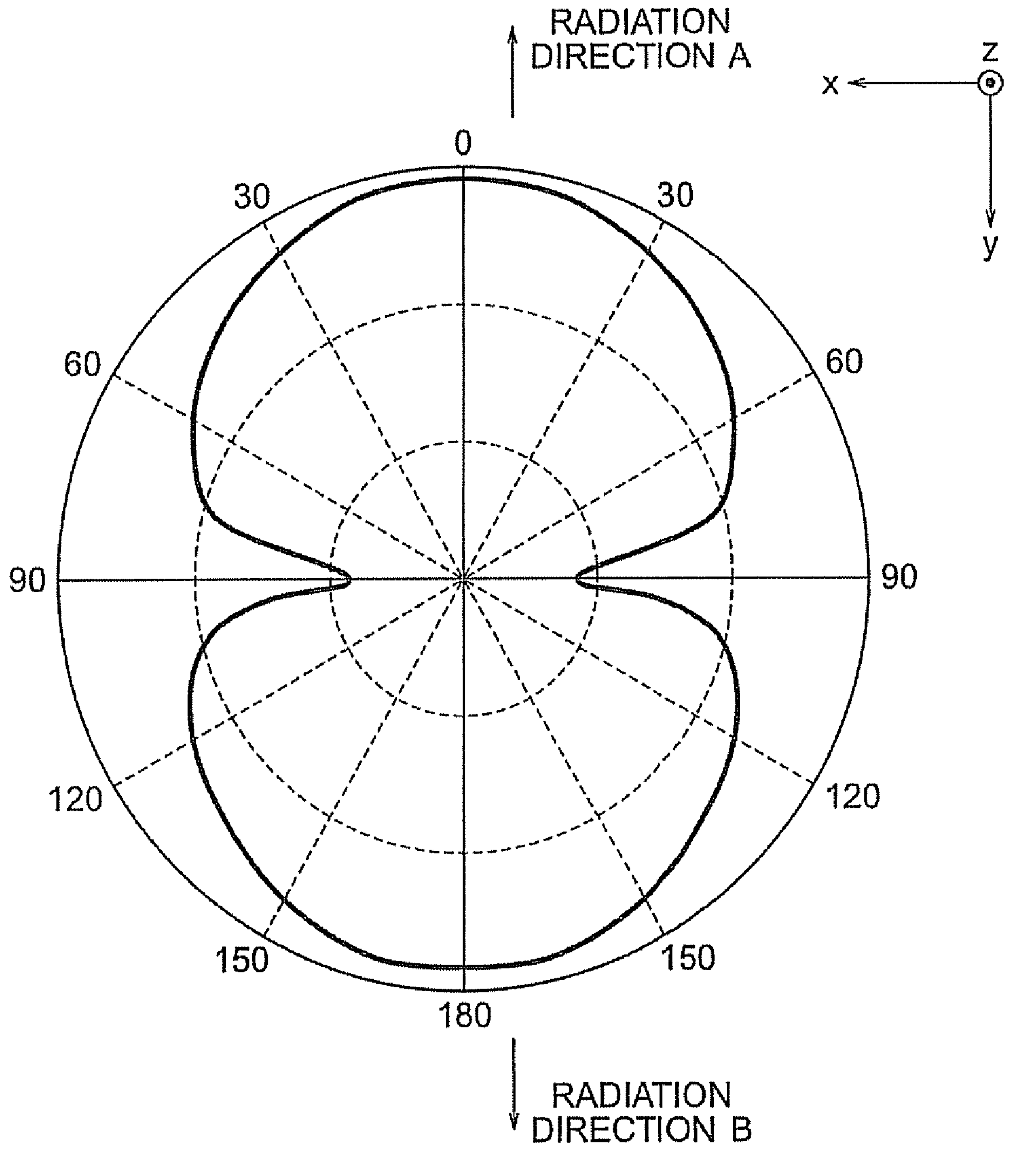
FIG. 11 is a view illustrating a radio wave radiation pattern in a state that the slot is opened.

On the other hand, in the state that the shutter 106 does not close the slot 107, the antenna section 1*a* acts as a slot antenna and the first conductive plate 101 functions as a reflection plate. In this state, however, since the first conductive plate 101 resonates at a desired frequency, radio wave also is radiated from the first conductive plate 101. A radiation pattern is as shown in FIG. 11 and a main lobe thereof is formed in a zero degree (0°) direction (radiation direction A) and in one hundred eighty degrees (180°) direction (radiation direction B), respectively.

Therefore, in a state that the shutter 106 does not close the slot 107, data of RFID tags located at opposite surfaces of the antenna section 1*a* can be read out.

In the above-described embodiment, the shutter 106 locates at a side of the second conductive plate 102 that is not opposite to the first conductive plate 101. The shutter 106 is not generally required as parts of antenna. It may be possible to adversely affect the performance of antenna if such a useless parts locates between an earth conductor and a radiating element. Therefore, in this embodiment, the shutter 106 is arranged as described above.

According to the above-described embodiment, since radio wave is radiated in a radiation direction A when the shutter 106 shuts the slot 107, the RFID tag reader/writer R can read out data from RFID tags which are located along the radiation direction A. On the other hand, as shown in FIG. 2, if the antenna section 1*a* of the RFID tag reader/writer R moves to the extended position and the shutter 106 opens the slot 107, radio wave is radiated from both sides of the antenna section 1*a*. In this state, if the antenna section 1*a* is inserted into a box in which articles are packed, data of RFID tags attached to articles can be read out by both surfaces of the antenna section 1*a* (radiation directions A and B) and thus the inventory operation can be carried our efficiently.

(Second Embodiment)

A second embodiment will be described.

The second embodiment is a modified example of the above-described first embodiment. Same numerals are applied to similar parts which are already described in the first embodiment and therefore detail descriptions thereof are not repeated.

Figure 12:
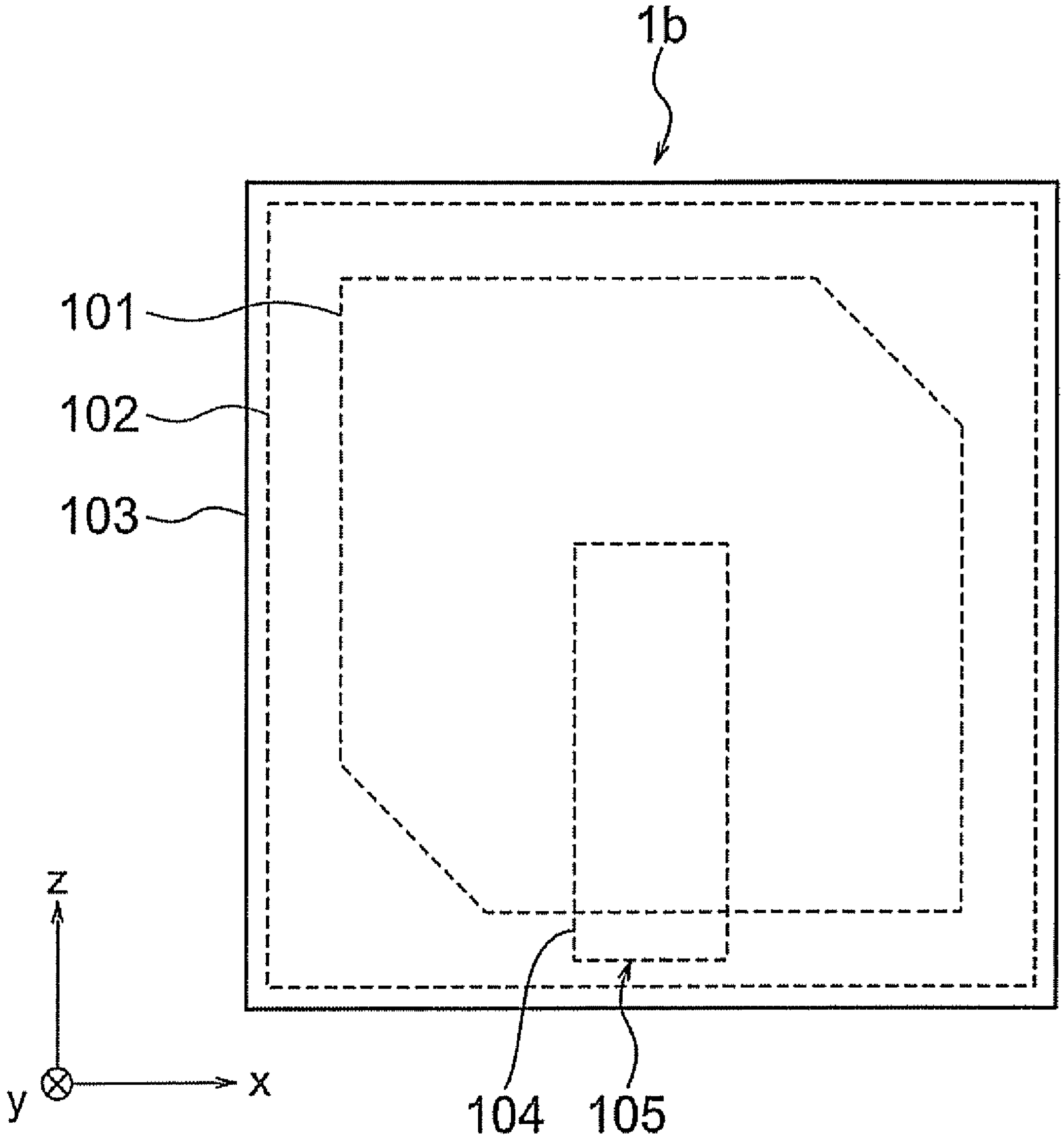
FIG. 12 is a front view illustrating an antenna device according to a second embodiment.
Figure 13:
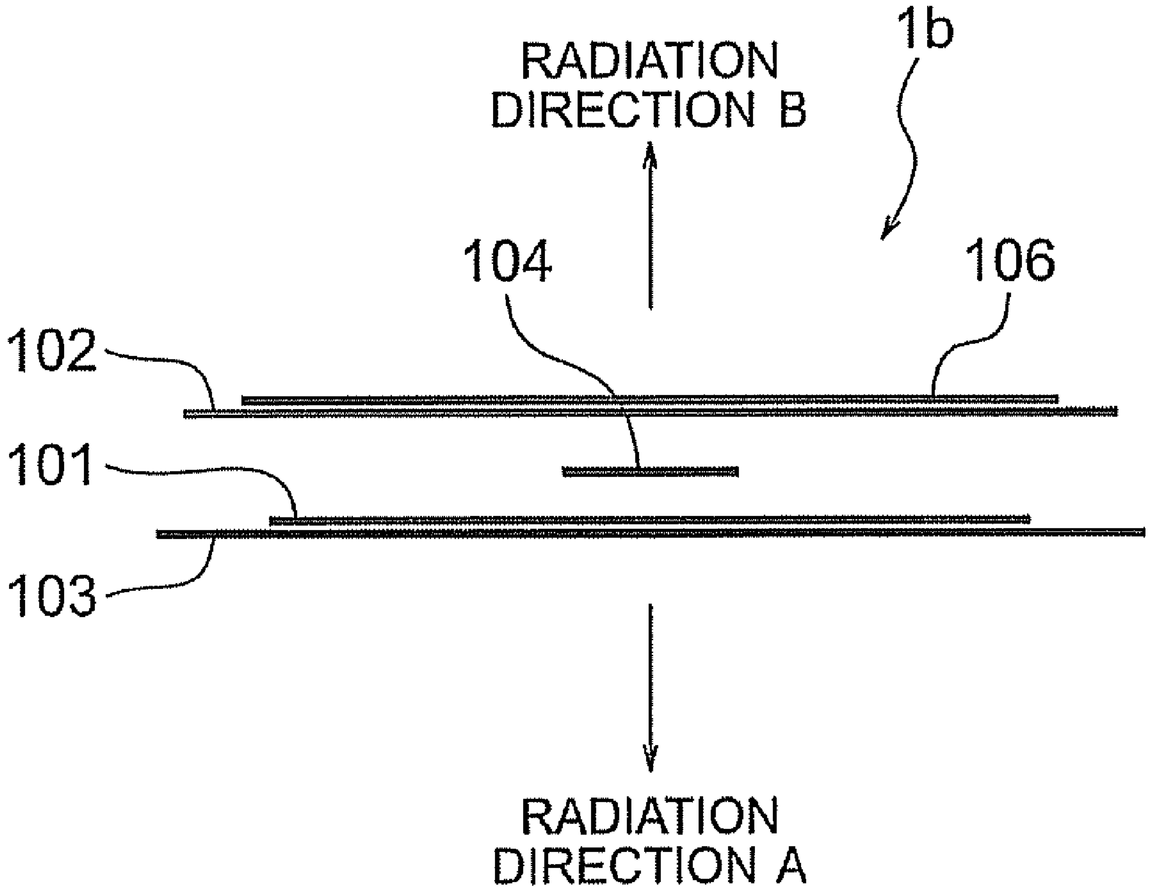
FIG. 13 is a plan view illustrating the antenna device in FIG. 12.
Figure 14:
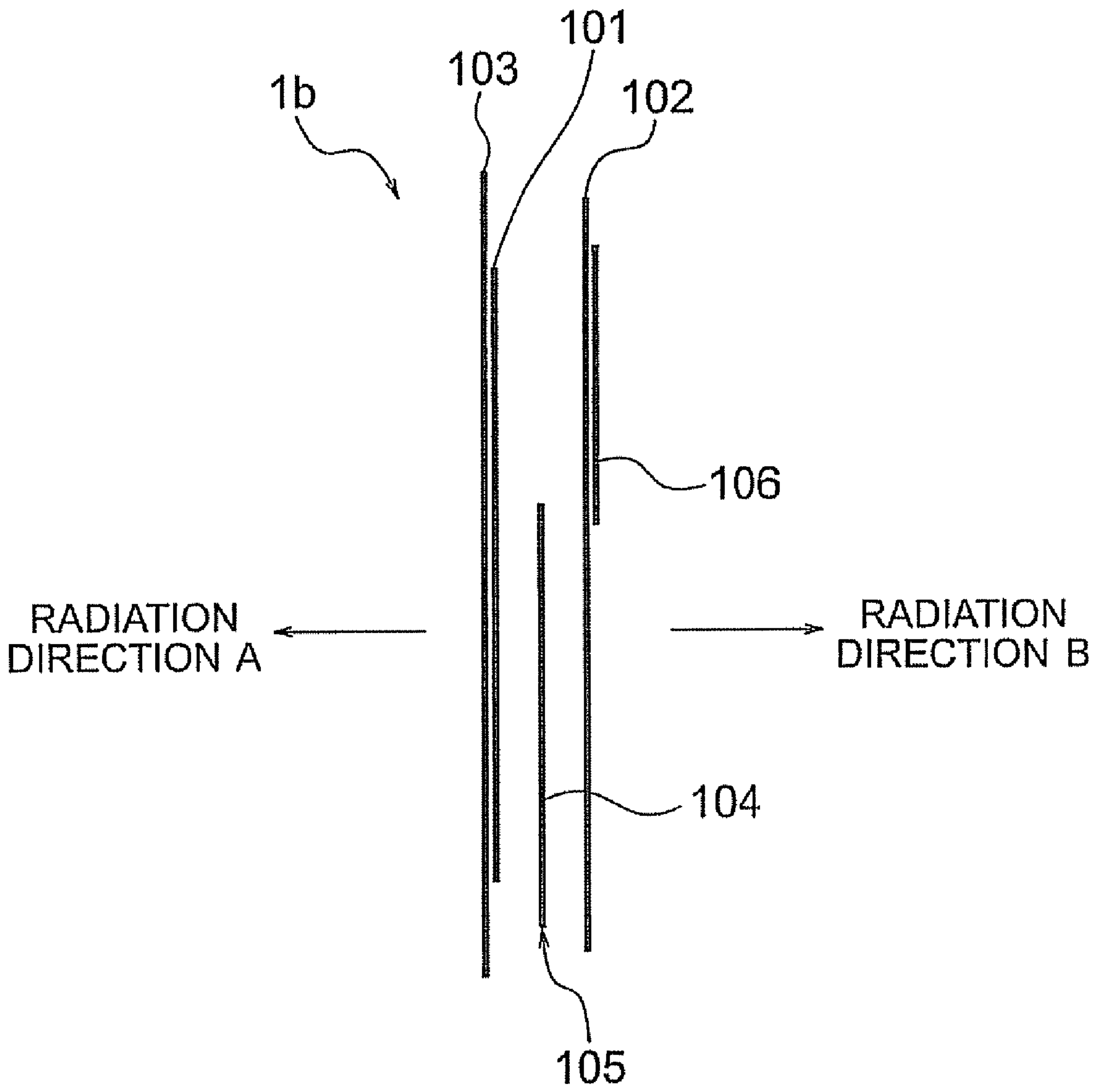
FIG. 14 is a side view illustrating the antenna device in FIG. 12.

FIGS. 12 through 14 are views for explaining an antenna device with which an RFID tag reader/writer is equipped according to the second embodiment. The RFID tag reader/writer of the second embodiment further has a third conductive plate 103.

The third conductive plate 103 is detachably mounted on a side of the first conductive plate 101 which is not opposite to the second conductive plate 102. The external size of the third conductive plate 103 is larger than that of the first conductive plate 101 and is equal to or greater than that of the second conductive plate 102.

When the shutter 106 opens the slot 107 and the third conductive plate 103 is arranged near the first conductive plate 101, as shown in FIGS. 13 and 14, the antenna section 1*b* of the second embodiment operates as a slot antenna. An arrangement of the third conductive plate 103 is that since the housing 112 is made of plastics, it may be adherently arranged on the outer surface of the housing 112 or be housed in the housing 112.

A radiation pattern of this arrangement is a pattern that is generally rotated by 180 degrees from the pattern shown in FIG. 10 and a main lobe is formed in the 180 degree direction (at a side of the slot 107).

As described above, it may change over the radiation direction of the radio wave by the antenna section 1*b* at three patterns by moving the shutter 106 (closing position or opening position).

(Third Embodiment)

A third embodiment will be described.

Figure 15:
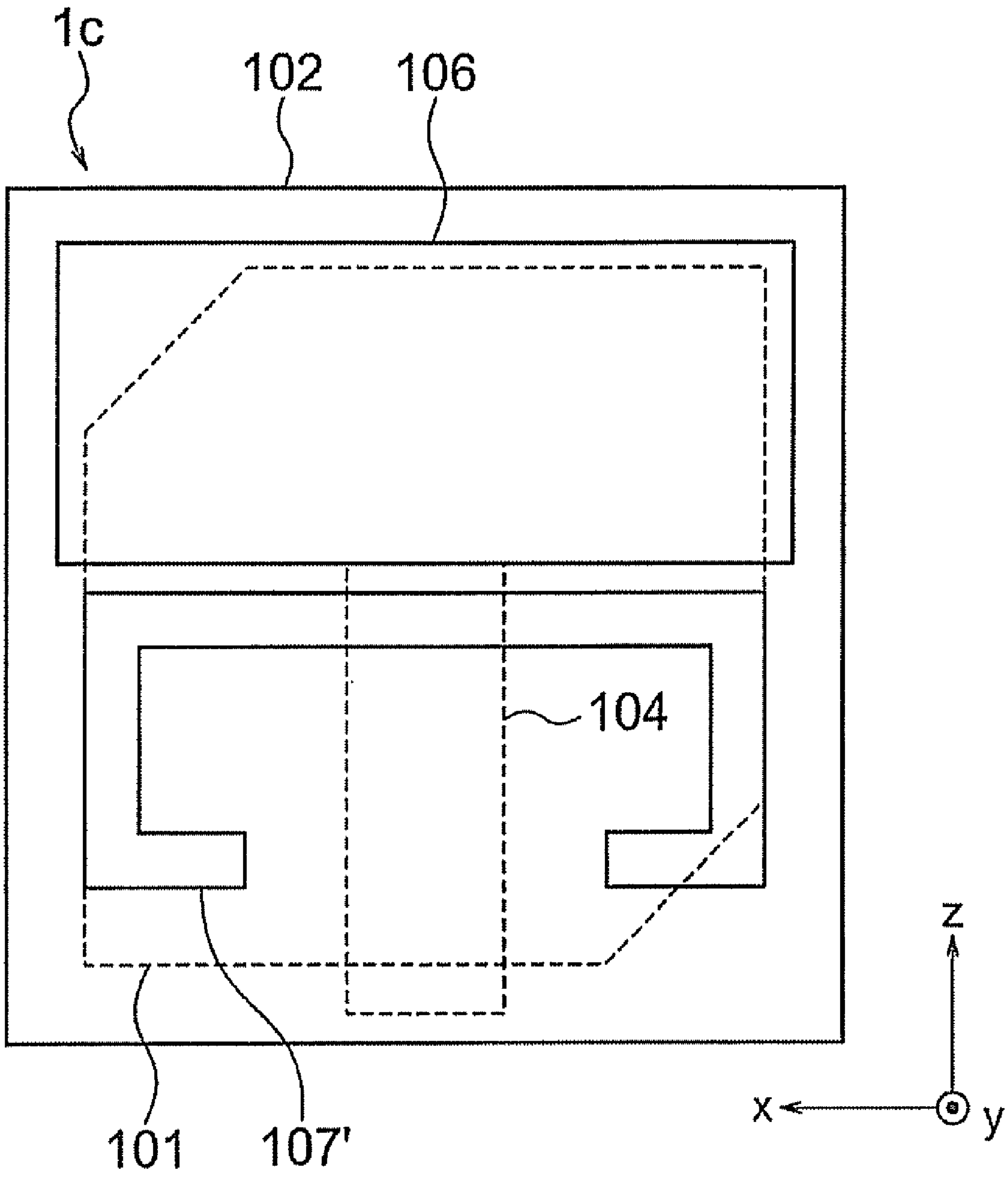
FIG. 15 is a front view illustrating a brief construction of an antenna device according to a third embodiment.

The third embodiment is a modified example of the above-described first and second embodiments. Same numerals are applied to similar parts which are already described in the embodiments and therefore detail descriptions thereof are not repeated. FIG. 15 is a view illustrating a general construction of an antenna device for an RFID tag reader/writer according to the third embodiment.

The antenna device according to the third embodiment includes a slot 107' which is different in shape from that of the first and second embodiments. In this embodiment, to make thinner the thickness of the entire device, a distance between the first conductive plate 101 and the second conductive plate 102 is narrowed and the entire length of the slot 107' (slot length) is set to be longer than the half wavelength of radio wave radiated from the antenna section 1*c*. That is, as shown in FIG. 15 for example, a slot 107' which is formed in a crooked shape not a rectangular shape is adopted.

According to the above-described embodiments, an example that the inventory of a lot of items is carried out is described. However, it is not limited to this inventory. It is also effective to read out data from a single RFID tag or a small number of RFID tags.

In the concrete, in a case that RFID tags to be read out locate at both sides of an antenna, the RFID tag reader/writer having the antenna device according to the above-described embodiments is effective. Moreover, in case that reading of data by radio wave radiated in a radiation direction A is difficult in view of a shape of the handle section, for example, reading of data from an RFID tag at a place where the RFID tag reader/writer is hardly inserted, the RFID tag reader/writer according to the above-described embodiments can read out data from an RFID tag with radio wave radiated in a radiation direction B.

In the above-described embodiments, a construction that the first conductive plate 101 has a substantially rectangular external shape is disclosed. However, it is not limited to this construction. For example, as to other construction, it can adopt a radiating element having a substantially circular external shape or a two points power feeding performed against a radiating element having a substantially rectangular external shape to realize a function performed as a circular polarized antenna.

As described above, according to the above-described embodiments, a radio wave radiating direction of a plane antenna can be switched over by opening/closing the slot formed on the second conductive plate, acting as an earth conductor, with the shutter 106. Therefore, data of an RFID tag located at the rear side of the antenna (second conductive plate side) can be read out simultaneously.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An RFID tag reader comprising:

a handle;

an antenna device comprising:

a first conductive plate;

a second conductive plate arranged in parallel with the first conductive plate, the second conductive plate having at least one slot formed thereon;

a power feeding element located between the first and second conductive plates to feed power to the first conductive plate; and a shutter configured to be movable to close/open the slot of the second conductive plate; and a hinge rotatably connecting the antenna device and the handle, wherein the antenna device is extendable around the hinge so that the antenna device moves between a folded-position that a surface of the second conductive plate on which the slot is formed faces the handle and an extended-position that the surface of the second conductive plate goes away from the handle.

2. The antenna device according to claim 1, wherein the first conductive plate includes a perturbation element to radiate a circular polarized radio wave.

3. The antenna device according to claim 1, wherein the first conductive plate acts as a radiating element when the slot is closed with the shutter.

4. The antenna device according to claim 3, wherein the second conductive plate acts as an earth conductor when the slot is closed with the shutter.

5. The antenna device according to claim 1, wherein the first conductive plate acts as a reflection plate when the slot is open.

6. The antenna device according to claim 1, wherein a length of the slot is set to be longer than the half wavelength of radio wave to be radiated.

7. The antenna device according to claim 1, wherein the shutter locates at a side opposite to the side of the second conductive plate facing the first conductive plate.

8. The antenna device according to claim 1 further including a third conductive plate detachably provided at a side opposite to the side of the first conductive plate facing the second conductive plate.

9. The antenna device according to claim 8, wherein the third conductive plate has an external size greater than that of the first and second conductive plates.

10. The antenna device according to claim 1 further including a lever connecting with the shutter to move the shutter from the outside of the antenna device.

11. The RFID tag reader according to claim 1, wherein the antenna device is extendable at 90 degrees relative to the handle.

12. The RFID tag reader according to claim 11, wherein the antenna device radiates radio wave from opposite surfaces thereof when the antenna device locates at the extended-position and the slot is open.

13. An antenna device comprising:

a first conductive plate;

a second conductive plate arranged in parallel with the first conductive plate, the second conductive plate having at least one slot formed thereon;

a power feeding element located between the first and second conductive plates to feed power to the first conductive plate; and a shutter configured to be movable to close/open the slot of the second conductive plate, wherein a length of the slot is set to be longer than a half wavelength of radio wave to be radiated.

14. An antenna device comprising:

a first conductive plate;

a second conductive plate arranged in parallel with the first conductive plate, the second conductive plate having at least one slot formed thereon;

a power feeding element located between the first and second conductive plates to feed power to the first conductive plate;

a shutter configured to be movable to close/open the slot of the second conductive plate; and a third conductive plate detachably provided at a side opposite to the side of the first conductive plate facing the second conductive plate.

* * * * *